United States Patent
Barron et al.

(10) Patent No.: US 6,997,436 B2
(45) Date of Patent: Feb. 14, 2006

(54) VEHICLE ACTUATOR WITH VALVE SEAT CUSHIONED BY O-RING

(75) Inventors: Luis F. Barron, El Paso, TX (US); Conrado Carrillo, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 188 days.

(21) Appl. No.: 10/649,213

(22) Filed: Aug. 26, 2003

(65) Prior Publication Data

US 2005/0045843 A1    Mar. 3, 2005

(51) Int. Cl.
*F16K 15/00* (2006.01)
(52) U.S. Cl. .................. 251/171; 251/129.15; 251/333
(58) Field of Classification Search ........... 251/129.15, 251/170, 171, 174, 333, 334, 359–365
See application file for complete search history.

(56) References Cited

U.S. PATENT DOCUMENTS

| | | | |
|---|---|---|---|
| 3,269,695 A * | 8/1966 | Grove .................. 251/174 |
| 4,311,395 A * | 1/1982 | Douthitt et al. ............... 366/27 |
| 4,815,699 A * | 3/1989 | Mueller .................. 251/129.11 |
| 6,189,519 B1 | 2/2001 | Press et al. |
| 6,305,758 B1 | 10/2001 | Hageman et al. |
| 6,460,295 B1 | 10/2002 | Johnson et al. |
| 6,481,526 B1 | 11/2002 | Millsap et al. |
| 6,517,089 B1 | 2/2003 | Phillis et al. |
| 6,547,031 B1 | 4/2003 | Magnus |
| 6,561,304 B1 | 5/2003 | Henry |
| 6,578,933 B1 | 6/2003 | Hageman et al. |
| 2003/0010953 A1 * | 1/2003 | Coppock .................... 251/326 |
| 2003/0051494 A1 * | 3/2003 | Ohya .......................... 62/199 |

* cited by examiner

*Primary Examiner*—J. Casimer Jacyna
(74) *Attorney, Agent, or Firm*—Jimmy L. Funke

(57) ABSTRACT

A valve for a control system of a vehicle includes a plunger slidably supported in a valve housing. Within the housing is a valve seat member that defines a valve seat configured for engaging the plunger in a closed configuration. The edges of the valve seat member are slightly spaced from the housing, and a resilient support element such as an o-ring is disposed between the valve seat member and the housing to permit lateral motion of the valve seat member relative to a long axis of the plunger as the plunger moves to the closed configuration.

19 Claims, 1 Drawing Sheet

VEHICLE ACTUATOR WITH VALVE SEAT CUSHIONED BY O-RING

FIELD OF THE INVENTION

The present invention relates generally to vehicle actuators.

BACKGROUND OF THE INVENTION

Actuators such as hydraulic valves used in vehicles in anti-lock braking systems (ABS), traction control systems, stability control systems, and other systems typically use electrically-controlled sliding plungers to selectively permit or prevent fluid flow through the actuator under particular circumstances, as required for the application. As recognized herein, to do this an actuator plunger may define a valve element that mates with a valve seat defined by a rigid plate. When the plunger slides to a closed configuration, the valve element of the plunger mates with the seat to block fluid flow through the seat.

The present invention understands that relatively precise alignment must be maintained between the plunger and valve seat, to ensure that the valve element mates properly with the seat. This typically requires the maintaining of relatively small tolerances, which increases manufacturing costs. As understood herein, it would be advantageous to absorb some misalignment between the plunger and valve seat and permit relaxed alignment tolerances.

SUMMARY OF THE INVENTION

An actuator includes a housing and a plunger slidably disposed in the housing and radially supported by a bushing. The plunger has a valve element on one end. A rigid valve seat member defines a valve seat configured for engaging the valve element when the plunger is moved to a closed configuration, wherein fluid flow through the valve seat is blocked by the valve element. As set forth further below, a resilient support element is disposed between the valve seat member and the housing to permit lateral motion of the valve seat member relative to a long axis of the plunger as the plunger moves to the closed configuration.

Preferably, the bushing contacts the valve seat member to substantially prevent motion of the valve seat member along the long axis of the plunger. The valve seat member can be sandwiched between the bushing and a portion of the housing, so that motion of the valve seat member along the axis of the plunger is prevented. To facilitate lateral motion of the valve seat member, the outer periphery of the valve seat member can be slightly spaced from the housing.

In another aspect, a control system for a vehicle includes a plunger slidably supported in a valve housing. A valve seat is configured for engaging the plunger in a closed configuration. The valve seat is permitted to move laterally with respect to the plunger as the plunger engages it, with fluid flow being permitted through the valve seat to components in the control system when the plunger is in an open configuration.

In still another aspect, a valve for a vehicle system includes a plunger, a housing slidably supporting the plunger for movement between an open configuration and a closed configuration, and a valve seat member in the housing. The valve seat member defines a valve seat that is blocked when the plunger is in the closed configuration and unblocked when the plunger is in the open configuration to permit fluid flow through the valve seat to the vehicle system. Means are provided for permitting lateral motion of the valve seat member relative to the plunger while laterally stabilizing the valve seat member.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
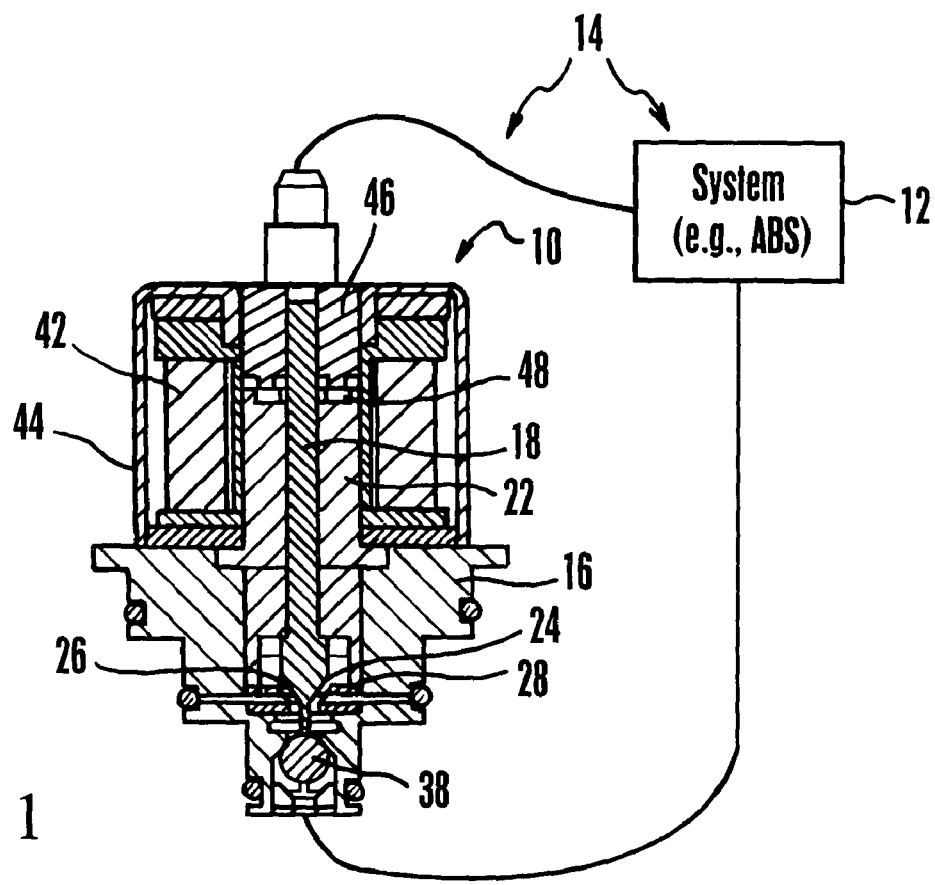
FIG. 1 is a cross-sectional elevational diagram of the present actuator, showing the plunger in the open configuration and schematically showing the control system in which it can operate.

Referring initially to FIG. 1, an actuator is shown, generally designated 10, that can be part of the fluid communication path of a control system 12 of a vehicle 14. The control system 12 may be any suitable control system requiring actuators such as but not limited to anti-lock braking systems (ABS), traction control systems, and stability control systems. The system 12 may include various sensors and a processor in accordance with principles known in the art, with the processor selectively energizing and deenergizing the below-described coil of the actuator 10 based on signals from the sensors as appropriate to control fluid flow through the system 12.

Figure 2:
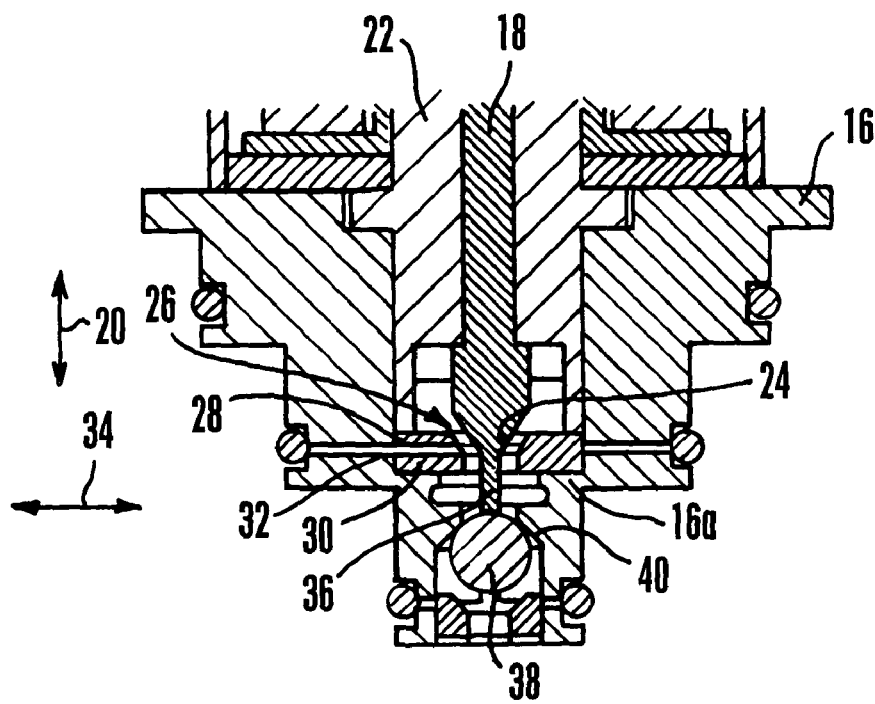
FIG. 2 is a cross-sectional elevational diagram showing the details of the valve seat member and o-ring.

As shown in FIGS. 1 and 2, the actuator 10 includes a rigid, hollow, preferably metal or plastic housing 16 in which a plunger rod 18 is slidably disposed for motion as indicated by the arrows 20, i.e., for motion along the long axis of the rod 18. A rigid bushing 22 made of, e.g., copper or other non-magnetic material is preferably disposed between the housing and plunger rod 18 to radially support the plunger rod 18.

FIGS. 1 and 2 show that the plunger rod 18 has a preferably frusto-conical shaped valve element formed on one end of the rod 18. As can be appreciated in reference to FIGS. 1 and 2, the valve element 24 can be moved against a preferably frusto-conical shaped valve seat 26 defined by a preferably rigid unitary or multi-piece valve seat member 28 within the housing 16. The valve seat 26 defines a fluid passageway. When the plunger rod 18 is in the closed configuration, i.e., against the valve seat 26, fluid flow through the fluid passageway of the valve seat 26 is prevented. On the other hand, when the plunger rod 18 is moved away from the valve seat 26 to an open configuration, fluid flow through the fluid passageway of the valve seat 26 is permitted.

As best shown in FIG. 2, the valve seat member 28 defines an outer periphery 30 that is slightly radially spaced from the housing 16. A resilient support element such as an o-ring 32 is disposed radially between the valve seat member 28 and the housing 16 in the annular space therebetween to stabilize the valve seat member 28 from moving in the directions indicated by the arrows 34, i.e., lateral to the long axis of the plunger rod 18, while nonetheless permitting lateral motion of the valve seat member 28 as the plunger moves to the closed configuration. In other words, the resilience of the o-ring 32 biases the valve seat member 28 to a central location within the housing 16, but the o-ring can absorb some lateral motion of the valve seat member 28 as the plunger engages it. On the other hand, the valve seat member 28 cannot move along the axis of the plunger rod 18 because it is sandwiched between the bushing 22, which contacts the valve seat element 28 as shown, and a portion 16a of the housing 16.

FIGS. 1 and 2 show that if desired, a plunger extension 36 can be provided on the valve element 24 to push a ball 38 away from a secondary valve seat 40 when the plunger rod 18 is in the closed configuration, permitting fluid flow through the secondary valve seat 40 at the same time that fluid flow through the previously discussed valve seat 26 is prevented. The plunger rod 18 may be actuated by selectively energizing and deenergizing a coil 42 located in a can 44 that is engaged with the valve housing 16. When the coil 42 is energized an electromagnetic coupling between the coil 42 and a plunger extension 46 moves the plunger extension 46 into an air gap 48 and the plunger rod 18, which moves with the plunger extension 46, moves into the closed configuration. Deenergizing the coil 42 causes the plunger to move back to the open configuration shown under the influence of fluid pressure on the ball 38, which pushes the plunger rod 18 back to the open configuration while closing the secondary valve seat 40.

While the particular VEHICLE ACTUATOR WITH VALVE SEAT CUSHIONED BY O-RING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. An actuator, comprising:
    a housing;
    a plunger slidably disposed in the housing, the plunger having a valve element on one end;
    a rigid valve seat member defining a frusto-conical shaped valve seat configured for engaging the valve element when the plunger is moved to a closed configuration, wherein fluid flow through the valve seat is blocked by the valve element; and
    a resilient support element disposed between the valve seat member and the housing to permit lateral motion of the valve seat member relative to a long axis of the plunger as the plunger moves to the closed configuration.

2. The actuator of claim 1, further comprising a vehicle control system in fluid communication with the actuator.

3. The actuator of claim 1, further comprising a rigid bushing between the housing and plunger to radially support the plunger.

4. The actuator of claim 3, wherein the bushing contacts the valve seat member to substantially prevent motion of the valve seat member along the long axis of the plunger.

5. The actuator of claim 4, wherein the valve seat member is sandwiched between the bushing and a portion of the housing.

6. The actuator of claim 1, wherein the valve seat member defines an outer periphery slightly spaced from the housing.

7. The actuator of claim 1, wherein the plunger is actuated by a coil.

8. A control system for a vehicle, comprising:
    a plunger slidably supported in a valve housing; and
    a frusto-conical valve seat configured for engaging the plunger in a closed configuration, the valve seat being permitted to move laterally with respect to the plunger as the plunger engages it, fluid flow being permitted through the valve seat to components in the control system when the plunger is in an open configuration.

9. The system of claim 8, further comprising a vehicle supporting the housing.

10. The system of claim 8, further comprising:
    a rigid valve seat member defining the frusto-conical valve seat; and
    a resilient support element disposed between the valve seat member and the housing to permit lateral motion of the valve seat member relative to a long axis of the plunger as the plunger moves to the closed configuration.

11. The system of claim 10, further comprising a rigid bushing between the housing and plunger to radially support the plunger.

12. The system of claim 11, wherein the bushing contacts the valve seat member to substantially prevent motion of the valve seat member along the long axis of the plunger.

13. The system of claim 12, wherein the valve seat member is sandwiched between the bushing and a portion of the housing.

14. The system of claim 10, wherein the valve seat member defines an outer periphery slightly spaced from the housing.

15. A valve for a vehicle system, comprising:
    a plunger;
    a housing slidably supporting the plunger for movement between an open configuration and a closed configuration;
    a frusto-conical shaped valve seat member in the housing and defining a valve seat that is blocked when the plunger is in the closed configuration and unblocked when the plunger is in the open configuration to permit fluid flow through the valve seat to the vehicle system; and means for permitting lateral motion of the valve seat member relative to the plunger while laterally stabilizing the valve seat member.

16. The valve of claim 15, wherein the means for permitting is a resilient support element disposed between the valve seat member and the housing.

17. The valve of claim 16, further comprising a rigid bushing between the housing and plunger to radially support the plunger.

18. The valve of claim 17, wherein the bushing contacts the valve seat member to substantially prevent motion of the valve seat member along the long axis of the plunger.

19. The valve of claim 18, wherein the valve seat member is sandwiched between the bushing and a portion of the housing.

* * * * *